A. V. LINDQUIST.
REEL.
APPLICATION FILED JULY 14, 1908.
919,042.
Patented Apr. 20, 1909.
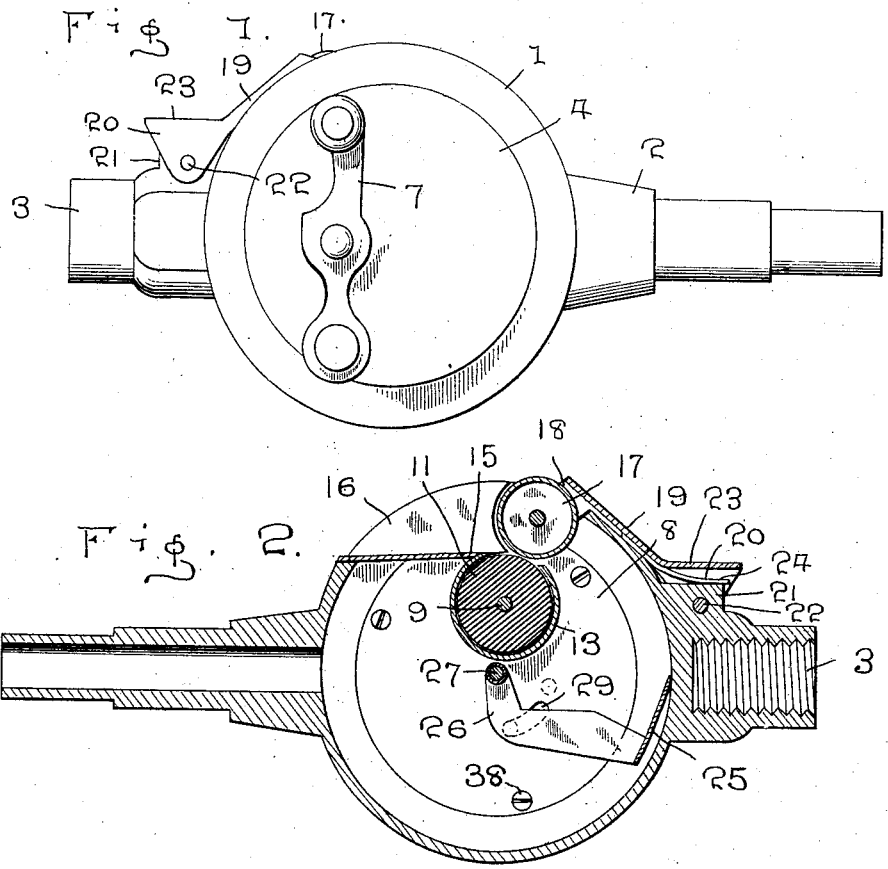
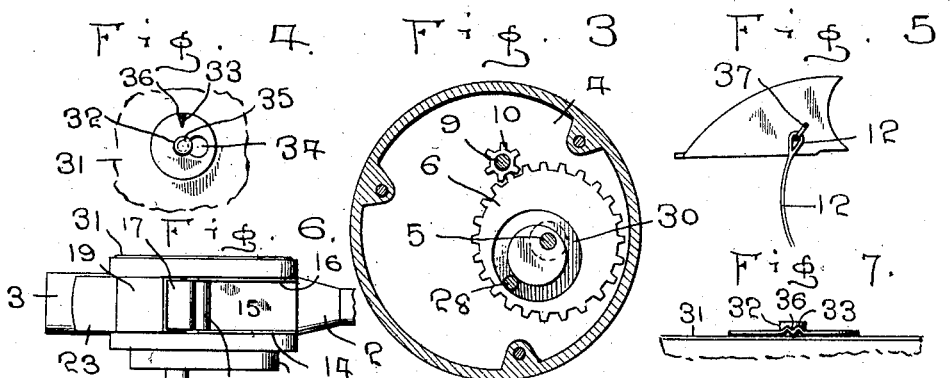
WITNESSES:
INVENTOR
A. V. Lindquist
BY
W. J. FitzGerald & Co.
Attorneys

UNITED STATES PATENT OFFICE.

ALBERT V. LINDQUIST, OF ALEXANDRIA, MINNESOTA.

REEL.

No. 919,042.　　　Specification of Letters Patent.　　　Patented April 20, 1909.

Application filed July 14, 1908. Serial No. 443,455.

*To all whom it may concern:*

Be it known that I, ALBERT V. LINDQUIST, a citizen of the United States, residing at Alexandria, in the county of Douglas and State of Minnesota, have invented certain new and useful Improvements in Reels; and I do hereby declare the following to be a full, clear, and exact description of the invention, such as will enable others skilled in the art to which it appertains to make and use the same.

My invention relates to new and useful improvements in reels and more particularly to that class employed in connection with fishing tackle and my object is to provide means for disposing the fishing line into a housing.

A further object is to provide means for disposing the line in compact form as it is wound into the housing.

A still further object is to provide means for varying the pressure on the line as it is being fed into or removed from the housing and a still further object is to provide means for securing a closure cap to one end of the housing.

Other objects and advantages will be hereinafter referred to and more particularly pointed out in the claims.

In the accompanying drawings which are made a part of this application, Figure 1 is a side elevation of my improved reel in its operative position. Fig. 2 is a central, vertical sectional view therethrough. Fig. 3 is a sectional view through a portion of the housing showing the feed-operating mechanism. Fig. 4 is a detail plan view showing the means for securing the removable closure to the housing. Fig. 5 is an elevation showing the manner of securing the end of the line to the housing. Fig. 6 is an edge elevation of the reel on a reduced scale, and Fig. 7 is an edge view of a portion of the reel showing the means for securing the removable closure to the housing.

Referring to the drawings in which similar reference numerals designate corresponding parts throughout the several views, 1 indicates the housing forming the body of my improved reel said housing being preferably cylindrical in cross section, the peripheral wall of the housing having tubular extensions 2 and 3 to which are to be secured the parts of a pole (not shown) the extension 2 being adapted to receive the body portion of the pole, while the extension 3 is interiorly threaded to receive the grip portion of the pole.

One end wall of the housing 1 is provided with an auxiliary housing 4 in which are located the operating gears for the parts of the reel, a shaft 5 extending laterally through the outer wall of the auxiliary housing, to the inner end of which is fixed a driving gear 6, while to the outer end thereof is secured the usual or any preferred form of crank 7, by which means the driving gear is rotated.

Extending through the space in the auxiliary housing through the closure cap 8 for the inner end of the auxiliary housing and through the space in the housing proper, is a shaft 9, that end of said shaft extending into the auxiliary housing 4 having fixed thereto a pinion 10, which is adapted to mesh with the driving gear 6 and impart movement to the driving shaft 9 and that portion of the shaft 9 extending through the space in the housing has fixed thereto a roller 11, over which the line 12 is to pass when being entered into or removed from the housing.

The major portion of the roller 11 is surrounded by a shield 13 extending outwardly and formed integral with the closure cap 8, so that when the line is being entered into the housing, said line will only contact the roller 11 at one point, thereby preventing the line from becoming entangled or wound around the roller.

A portion of the peripheral wall of the housing 1 is cut away to form a slot 14, through which the line 12 enters the housing 1, said line being positively guided into the housing and over the exposed portion of the roller 11 by means of a guide plate 15, one end of said guide plate engaging the shield 13 adjacent the cut away portion thereof, while the opposite end thereof engages the peripheral wall of the housing 1, the side flanges 16 of the guide plate being extended upwardly and having their edges curved to fit the contour of the curvature of the housing.

In order to wind the line into the housing, it is necessary to hold the line in engagement with the exposed surface of the roller 11 under pressure and to accomplish this result, I mount a friction roller 17 in position to engage the exposed portion of the roller 11, said friction roller being carried between ears 18 on an arm 19, the free end of said arm having depending ears 20, which extend to each side of a shoulder 21 on the tubular extension 3, a pivot pin 22 being introduced through the depending ears 20 and shoulder 21 on which the arm 19 is adapted to swing. That portion of the arm 19 immediately over the shoulder 21 normally rests in a horizontal plane to form a thumb plate 23, against which downward pressure is applied to swing the friction roller out of engagement with the line and thus permit the line to freely leave the housing and by elevating the thumb plate a distance above the shoulder and introducing a spring 24 between the arm 19 and shoulder 21, the friction roller will be normally held in engagement with the main roller, one end of said spring being fixed to the under side of the arm 19, while the lower end thereof rests upon the shoulder 21. If a greater pressure is required than is furnished by the tension of the spring 24, the thumb of the operator may be moved into engagement with the arm 19 and the pressure of the friction roller increased to such an extent as to require a considerable pull to remove the line between the two rollers and by applying a sufficient amount of pressure, the movement of the line may be entirely stopped, if so preferred.

The line is stored in the housing 1 and caused to move away from the point of entrance therein by means of a feed plate 25, said plate being carried by means of arms 26, said arms extending inwardly from opposite edges of the feed plate and having their inner ends mounted on a shaft 27, the arms being of sufficient length to dispose the feed plate in close proximity to the edge wall of the housing 1.

The feed plate 25 is oscillated or moved upwardly and downwardly by securing to one of the arms 26 a wrist pin 28, which pin extends through a slot 29 in the closure cap 8 and enters a circular channel 30 in the face of the driving gear 6 and by placing said circular channel eccentric to the shaft 5, the feed plate 25 will be moved upwardly and downwardly when the driving gear 6 is rotated and by extending the feed plate 25 a distance above the arms 26 and placing the same at a tangent to the inner face of the wall of the housing 1, the lower end of the feed plate will engage the line as it is fed into the housing and move the same out of the path of the incoming line, at the same time causing the line to rest in folds or layers and be in position to readily leave the housing without becoming entangled.

Access is had to the interior of the housing 1 by providing that end of the housing opposite the auxiliary housing with a removable cover 31, which cover is held in position over the open end of the housing by extending the shaft 27 through the cover 31 and providing the extended end of said shaft with an enlarged head 32. The head thus formed is engaged by a keeper 33, which keeper is provided with an opening 34 of sufficient diameter to receive the head 32 and communicating with said opening is a seat 35, which, when the keeper is moved laterally below the head 32, engages that portion of the shaft 27 between the head and face of the cover 31 and as said seat is of less diameter than the diameter of the head 32, the keeper will be prevented from casually leaving the end of the shaft, while the cover will be securely clamped in position over the end of the housing. The keeper 33 is held against free movement on the end of the shaft 27 by striking down a portion of the keeper 33 to form a projection 36 and by placing the keeper 33 on the shaft 27 with the projection extending inwardly, said projection will bind against the outer face of the cover 31 and prevent free movement of the keeper 33 at the same time causing the cover 31 to positively clamp the end of the housing.

In using my improved reel, the sections of the rod are secured to the extensions 2 and 3 and the line properly extended along the pole in the usual manner, the inner end of the line being passed between the rollers 11 and 17 and the extreme inner end thereof anchored to an eye 37 on one of the side flanges 16 of the guide plate 15. In casting the bait, the friction roller 17 is lifted out of engagement with the roller 11 by directing downward pressure on the thumb plate 23, thereby permitting the line to freely leave the housing and as soon as the casting process has been completed, the pressure of the thumb plate is released and the friction roller directed into engagement with the line and roller 11 by the tension of the spring 24. As soon as a strike has been made and it is desired to play the fish, the pressure of the friction roller is increased or diminished as desired by directing pressure on the arm 19 with the thumb and when reeling in the line, the friction roller is held firmly in engagement with the main roller and said main roller rotated through the medium of the crank 7, the rotating of the crank 7 also operating the feed plate 25 to properly store the line within the housing.

If access is to be had to the interior of the housing 1, the keeper 33 is moved laterally until the head 32 is registered with the opening 34, when the keeper and cover 31 may be readily removed from the end of the shaft 27 and if further access is to be had to the auxiliary housing 4, the screws 38 employed for holding the closure cap 8 in position are removed and the closure cap lifted from position, the guide plate 15 being first removed from the slot 14 and the friction roller 17 swung outwardly to its full extent.

It will thus be seen that I have provided a very cheap, durable and economical form of reel and one that can be readily operated for casting purposes or for playing fish and it will likewise be seen that the pressure on the line as it passes between the two rollers will tend to remove the moisture from the line, so that said line will maintain its preservation a greater length of time than when the line is wound upon the usual form of reel spool. It will likewise be seen that by providing the feed plate and operating the same as shown, the line will be readily stored within the housing and so placed as not to become entangled while being removed from the housing. It will also be seen that by removably securing the cover at the end of the housing, ready access may be had to the interior of the housing at any and all times.

What I claim is:

1. The herein described reel comprising a housing having a slot therein, extensions on said housing, a guide plate seated in said slot, a roller in said housing adjacent to and below the inner end of said guide plate, a shield partially surrounding said roller, a friction roller adapted to engage the exposed portion of the first-named roller, means to remove the friction roller from engagement with the first-mentioned roller when desired, a feed plate pivotally mounted in said housing and means to move said feed plate upwardly and downwardly to store said line into the housing.

2. In a reel, the combination with a housing having a slot therein, an auxiliary housing communicating with the main housing, a closure cap for said auxiliary housing and extensions on said housing; of a roller, a supporting shaft for said roller, a shield partially surrounding said roller, a friction roller adapted to engage the first-mentioned roller, a pivotally mounted arm for the friction roller, means to normally hold the friction roller in engagement with the first-mentioned roller, means to impart rotating movement to the first mentioned roller, a feed plate movably mounted in said housing, means connecting said feed plate with the roller operating mechanism, and means to move said plate upwardly and downwardly to store said line in the housing.

3. In a reel, the combination with a housing having a slot therein and means to dispose a line into said housing; of a feed plate pivotally mounted in said housing and means to move said feed plate upwardly and downwardly to store said line into the housing.

4. In a reel, the combination with a housing, having a slot therein and means to deposit a line into said housing; of a feed plate, arms for said feed plate, means to pivotally mount said arms in the housing, a driving gear having a circular channel eccentrically arranged to the axis of the driving gear and a wrist pin extending into said channel from one of said arms, whereby the feed plate will be moved upwardly and downwardly when the driving gear is rotated to store said line in the housing.

5. In a reel, the combination with a housing having one of its ends open and a line controlling mechanism in said housing; of a cover for the open end of said housing, a shaft extending through said cover and having a head at its outer end, of greater diameter than the diameter of the shaft, a keeper having a seat therethrough to receive the shaft and an opening at one end of the seat of a diameter to receive the head, said keeper having an inwardly extending projection adapted to bind on the cover and retain the seat in engagement with the shaft and below the head.

In testimony whereof I have signed my name to this specification in the presence of two subscribing witnesses.

ALBERT V. LINDQUIST.

Witnesses:
C. A. KORTSCH,
A. SEEGER.